(12) United States Patent
Kaefer

(10) Patent No.: US 9,401,617 B2
(45) Date of Patent: Jul. 26, 2016

(54) HYBRID DRIVE DEVICE

(75) Inventor: Oliver Kaefer, Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 423 days.

(21) Appl. No.: 13/878,296

(22) PCT Filed: Aug. 26, 2011

(86) PCT No.: PCT/EP2011/064725
§ 371 (c)(1),
(2), (4) Date: Jun. 24, 2013

(87) PCT Pub. No.: WO2012/045522
PCT Pub. Date: Apr. 12, 2012

(65) Prior Publication Data
US 2013/0265012 A1    Oct. 10, 2013

(30) Foreign Application Priority Data
Oct. 8, 2010 (DE) .......................... 10 2010 042 183

(51) Int. Cl.
*B60W 10/26* (2006.01)
*H02J 7/00* (2006.01)
(Continued)

(52) U.S. Cl.
CPC . *H02J 7/007* (2013.01); *B60L 7/10* (2013.01); *B60L 11/123* (2013.01); *B60L 11/1862* (2013.01); *B60W 10/06* (2013.01); *B60W 10/08* (2013.01); *B60W 10/18* (2013.01); *B60W 10/24* (2013.01); *B60W 10/26* (2013.01); *B60W 20/00* (2013.01); *B60W 20/13* (2016.01); *B60W 20/14* (2016.01); *B60W 30/18127* (2013.01);
(Continued)

(58) Field of Classification Search
CPC ........................ B60W 20/106; B60W 20/1062
USPC .............................. 180/65.285, 65.28, 65.265
See application file for complete search history.

(56) References Cited

U.S. PATENT DOCUMENTS 5,786,640 A * 7/1998 Sakai ........................ B60K 6/46
                                                                   180/65.245
5,788,597 A * 8/1998 Boll ........................ B60K 6/46
                                                     180/165

(Continued)

FOREIGN PATENT DOCUMENTS

CN            1310778         4/2007
CN            100509512       7/2009

(Continued)

OTHER PUBLICATIONS

International Search Report, International Application No. PCT/EP2011/064725, dated Dec. 20, 2011.

*Primary Examiner* — Jeffrey J Restifo
(74) *Attorney, Agent, or Firm* — Norton Rose Fulbright US LLP

(57) ABSTRACT

A method for operating a hybrid drive device including an internal combustion engine-generator unit as a range extender, at least one electric machine for driving and for decelerating the hybrid vehicle, and a battery. During operation of the at least one electric machine, the electrical power provided by a generator of the internal combustion engine-generator unit and/or the electrical power provided by the at least one electric machine in regenerative mode for charging the battery is/are controlled and/or regulated in such a way that the electrical charging capacity of the battery is below a predefined limiting value.

22 Claims, 3 Drawing Sheets

(51) Int. Cl.
*B60W 10/06* (2006.01)
*B60W 10/08* (2006.01)
*B60W 10/18* (2012.01)
*B60W 10/24* (2006.01)
*B60W 30/18* (2012.01)
*B60L 7/10* (2006.01)
*B60L 11/12* (2006.01)
*B60L 11/18* (2006.01)
*B60W 20/00* (2016.01)

(52) U.S. Cl.
CPC .... *B60W2510/244* (2013.01); *B60W 2510/305* (2013.01); *B60W 2710/244* (2013.01); *Y02T 10/6217* (2013.01); *Y02T 10/6286* (2013.01); *Y02T 10/7005* (2013.01); *Y02T 10/705* (2013.01); *Y02T 10/7044* (2013.01); *Y02T 10/7077* (2013.01)

(56) References Cited

U.S. PATENT DOCUMENTS

| | | | | |
|---|---|---|---|---|
| 6,116,368 A * | 9/2000 | Lyons | | B60K 6/46 180/165 |
| 6,262,491 B1 * | 7/2001 | Kitajima | | B60K 6/485 180/65.26 |
| 6,330,498 B2 * | 12/2001 | Tamagawa | | B60K 6/46 180/65.26 |
| 6,359,404 B1 * | 3/2002 | Sugiyama | | B60K 6/48 180/65.25 |
| 7,328,763 B2 * | 2/2008 | Gouda | | B60K 6/387 180/214 |
| 7,657,438 B2 * | 2/2010 | Obayashi | | B60K 6/46 180/65.21 |
| 7,730,984 B2 * | 6/2010 | Heap | | B60K 6/365 180/65.285 |
| 7,753,150 B2 * | 7/2010 | Tamor | | B60W 10/06 180/65.265 |
| 7,841,433 B2 * | 11/2010 | Soliman | | B60K 6/442 180/65.21 |
| 7,869,913 B2 * | 1/2011 | Aoyama | | H02J 7/1423 180/65.265 |
| 7,885,737 B2 * | 2/2011 | Hirata | | B60K 6/48 180/65.1 |
| 7,956,560 B2 * | 6/2011 | Izumi | | B60L 11/1851 180/65.285 |
| 8,204,640 B2 * | 6/2012 | Tani | | B60K 6/445 180/65.265 |
| 8,311,692 B2 * | 11/2012 | Mulot | | B60K 6/365 701/22 |
| 8,738,260 B2 * | 5/2014 | Miyazaki | | B60T 1/10 180/65.265 |
| 2005/0189894 A1 * | 9/2005 | Komiyama | | B60K 6/46 318/376 |
| 2012/0253579 A1 * | 10/2012 | Groeter | | B60K 6/46 701/22 |
| 2015/0197242 A1 * | 7/2015 | Yamazaki | | B60W 20/30 701/22 |
| 2015/0210152 A1 * | 7/2015 | Arkus | | B60L 11/1809 180/65.245 |
| 2015/0210267 A1 * | 7/2015 | Sato | | B60W 20/1088 701/22 |
| 2015/0239467 A1 * | 8/2015 | Wang | | B60W 20/40 477/5 |
| 2015/0246591 A1 * | 9/2015 | Ono | | B60H 1/004 701/22 |
| 2015/0266465 A1 * | 9/2015 | Kato | | B60W 10/26 701/22 |

FOREIGN PATENT DOCUMENTS

| | | |
|---|---|---|
| DE | 102006040638 | 3/2008 |
| DE | 10 2008 039 907 | 7/2009 |
| DE | 10 2009 054 839 | 6/2011 |
| EP | 1 876 082 | 1/2008 |
| FR | 2 851 516 | 8/2004 |
| GB | 2358845 | 8/2001 |
| JP | 7-46709 | 2/1995 |
| JP | 7048709 | 2/1995 |
| JP | 0879911 A | 3/1996 |
| JP | 8-289407 | 11/1996 |
| JP | 9154202 | 6/1997 |
| JP | 2003-125502 | 4/2003 |
| JP | 2005-253126 | 9/2005 |
| JP | 2011-508696 | 3/2011 |
| WO | WO 2009/080901 | 7/2009 |

* cited by examiner

HYBRID DRIVE DEVICE

FIELD

The present invention relates to a method for operating a hybrid drive device, and a hybrid drive device.

BACKGROUND INFORMATION

Motor vehicles that are driven by an electric machine are being developed and/or manufactured by the automotive industry in ever-increasing numbers. The electrical power for operating the electric machine for driving the electric vehicle originates from a battery situated in the electric vehicle. The battery is charged at a power supply when the electric vehicle is at a standstill. The electric vehicle includes a charger unit for this purpose. The capacity for storing electrical power in the battery is limited, so that the electric vehicle is able to achieve ranges of only approximately 50 km to 200 km. To increase the range of the electric vehicle, it is provided with a so-called range extender (an internal combustion engine-generator unit). For fairly long trips of the electric vehicle, during which the battery is not chargeable or is not sufficiently chargeable by a power supply, the internal combustion engine-generator unit charges the battery, and/or the internal combustion engine-generator unit supplies electrical current to the electric machine. The possible range of this type of electric vehicle having a range extender may thus be extended to ranges which correspond to those of conventional motor vehicles driven solely by an internal combustion engine.

The electric machine of the motor vehicle is operated both as an electric motor and as a generator. During operation as an electric motor, the electric machine is used to drive the motor vehicle, and during operation of the electric machine as a generator in regenerative mode, the electric machine is used to decelerate the motor vehicle or hybrid vehicle. If operation of the internal combustion engine-generator unit is necessary while driving the hybrid vehicle, the electrical power provided by the internal combustion engine-generator unit is used to operate the electric machine as an electric motor and also to charge the battery. A deceleration or a braking operation of the hybrid vehicle may occur during this type of operation. During a deceleration operation of the hybrid vehicle, the electric machine is switched from operating as an electric motor to operating as a generator, and thus generates electrical power for charging the battery. However, the internal combustion engine-generator unit is also still operating, so that the electrical charging capacity of the battery is composed of the electrical power of the electric machine as a generator and also of the electrical power provided by the internal combustion engine-generator unit. This may result in overvoltages in the charging voltage of the battery, or a high charging current, which may result in damage to the high-voltage components of the hybrid vehicle, in particular the battery.

German Patent Application No. DE 10 2008 039 907 describes a vehicle having a power source, an electrical power store, a generator which is designed to generate electrical power and to charge the electrical power store, an electric traction motor, and an activating device which is designed for switching the power source on and/or off, a starter device having a control element which initiates the switch-on and/or the switch-off of the power source by the activating device, the control element being designed in such a way that it allows the initiation without the driver having to be in the vehicle at the time of the initiation.

SUMMARY

An example method according to the present invention for operating a hybrid drive device, the hybrid drive device including an internal combustion engine-generator unit as a range extender, at least one electric machine for driving and for decelerating the hybrid vehicle, and a battery, having the following steps: generating mechanical energy in an internal combustion engine, converting the mechanical energy into electrical power in a generator of the internal combustion engine-generator unit, charging the battery with electrical power from the generator of the internal combustion engine-generator unit, and/or charging the battery with electrical power from the electric machine in regenerative mode, whereby during operation of the at least one electric machine as a generator for decelerating the hybrid vehicle and charging the battery with electrical power from the at least one electric machine in regenerative mode, the electrical power provided by the generator of the internal combustion engine-generator unit and/or the electrical power provided by the at least one electric machine in regenerative mode for charging the battery is/are controlled and/or regulated in such a way that the electrical charging capacity of the battery is below a predefined limiting value.

During a deceleration or braking operation of the hybrid vehicle, the at least one electric machine is operated in regenerative mode, and as a generator provides electrical power for charging the battery, in particular a high-voltage battery. During this operation of the at least one electric machine in regenerative mode, the electrical power provided by the at least one electric machine for charging the battery with simultaneous operation of the internal combustion engine-generator unit is initially held at a low value or switched off, so that the sum of the electrical power provided by the at least one electric machine and the internal combustion engine-generator unit does not exceed a predefined limiting value, and thus, no damage to the high-voltage components of the hybrid drive device, in particular the battery, occurs.

In particular, the electrical power provided by the generator of the internal combustion engine-generator unit is controlled and/or regulated via the speed of the internal combustion engine and/or the rotational speed of the generator of the internal combustion engine-generator unit, and/or the predefined limiting value of the electrical charging capacity of the battery is between 0.9 and 2.5 times, in particular between 0.9 and 1.5 times, the maximum electrical power of the internal combustion engine-generator unit, and/or the predefined limiting value is a function of parameters, for example the temperature, of components, for example the battery, of the hybrid drive device.

In another embodiment, the electrical charging capacity of the battery is formed from the sum of the electrical power provided by the generator of the internal combustion engine-generator unit and the electric machine, and the required electrical (consumed) power of auxiliary units, an air conditioner or heater, for example, is preferably taken into account. The auxiliary units consume electrical power, so that the electrical charging capacity of the battery thus corresponds to the sum of the electrical power provided by the generator of the internal combustion engine-generator unit and the electric machine, minus the electrical (consumed) power of auxiliary units.

In another specific embodiment, the electrical power provided by the generator of the internal combustion engine-generator unit is controlled and/or regulated as a function of the regenerative torque of the electric machine, and/or vice versa. The hybrid vehicle is braked or decelerated by the electric machine in regenerative mode with the aid of the regenerative torque, and the electric machine as a generator is driven and generates electrical power with the aid of the regenerative torque. The regenerative torque is thus directly proportional to the electrical power provided by the electric machine.

The electrical power provided by the generator of the internal combustion engine-generator unit is preferably controlled and/or regulated in inverse proportion to the regenerative torque of the electric machine, and/or the regenerative torque of the electric machine is preferably controlled and/or regulated in inverse proportion to the electrical power provided by the generator of the internal combustion engine-generator unit.

In another embodiment, the greater the control and/or regulation of the regenerative torque of the electric machine, the lesser the electrical power provided by the generator of the range extender, and vice versa.

In one variant, the regenerative torque is increased beginning at the start of a deceleration operation.

During an initial period of a deceleration operation, the electric machine advantageously provides no regenerative torque, and/or the total braking torque is formed from the sum of the regenerative torque and a braking torque of at least one hybrid vehicle brake. The hybrid vehicle is braked or decelerated by a total braking torque, which is composed of the regenerative torque of the electric machine and the braking torque of at least one hybrid vehicle brake. The hybrid vehicle brake is, for example, a disc brake or drum brake on the hybrid vehicle.

In another specific embodiment, during an initial period of the deceleration operation the electric machine provides no regenerative torque until the electrical power provided by the generator of the range extender is reduced, for example by at least 5%, 10%, or 20%. During the initial period of the deceleration operation the range extender is still in operation, and in order to avoid electrical charging capacity being additionally supplied to the battery due to operation of the electric machine in regenerative mode, the total braking torque is provided during the initial period solely by the at least one hybrid vehicle brake. Only when the electrical power of the internal combustion engine-generator unit has been reduced is it possible for the regenerative torque or the electrical power provided by the electric machine to be correspondingly increased by the same extent.

In particular, the alternating current generated by the generator of the internal combustion engine-generator unit and/or the electric machine is converted into direct current for charging the battery by a rectifier, which is preferably uncontrolled.

In another example embodiment, the electrical current provided by the generator of the internal combustion engine-generator unit and/or the electrical current provided by the electric machine in regenerative mode for charging the battery is/are controlled and/or regulated in such a way that the electrical charging current of the battery is below a predefined current limiting value.

In another variant, a vehicle control unit specifies the setpoint torque, in particular the regenerative torque and/or the drive torque, of the electric machine, and/or an electronic control unit controls and/or regulates the actual torque, in particular the regenerative torque and/or the drive torque, of the electric machine, and/or a range extender control unit controls and/or regulates the electrical power provided by the generator of the internal combustion engine-generator unit.

A hybrid drive device according to the present invention for a hybrid vehicle includes the following: an electric machine for driving and for decelerating the hybrid vehicle, a battery, an internal combustion engine-generator unit as a range extender for charging the battery and/or for generating electrical power for the electric machine as a motor, whereby a method described in the present industrial property right application may be carried out.

In another variant, the hybrid drive device includes a rectifier, which is preferably uncontrolled, for converting the alternating current generated by the generator of the range extender and/or the electric machine into direct current for charging the battery.

In another embodiment, the hybrid drive device includes a vehicle control unit via which the setpoint torque of the electric machine is specifiable, and/or the hybrid drive device includes an electronic control unit for controlling and/or regulating the actual torque of the electric machine, and/or the hybrid drive device includes a range extender control unit for controlling and/or regulating the electrical power provided by the generator of the internal combustion engine-generator unit.

In particular, the vehicle control unit, the electronic control unit, and the range extender control unit are combined into one control unit.

In one variant, the generator is a, preferably permanent-magnet, synchronous electric machine.

BRIEF DESCRIPTION OF THE DRAWINGS

One exemplary embodiment of the present invention is described in greater detail below with reference to the figures.

DETAILED DESCRIPTION OF EXAMPLE EMBODIMENTS

Figure 1:
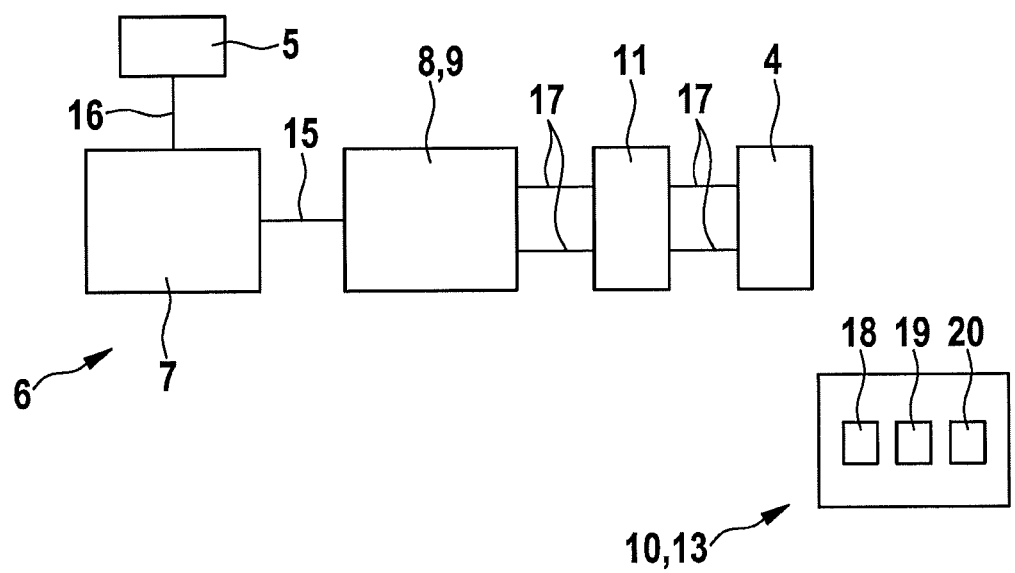
FIG. 1 shows a schematic system diagram of an internal combustion engine-generator unit as a range extender.
Figure 2:
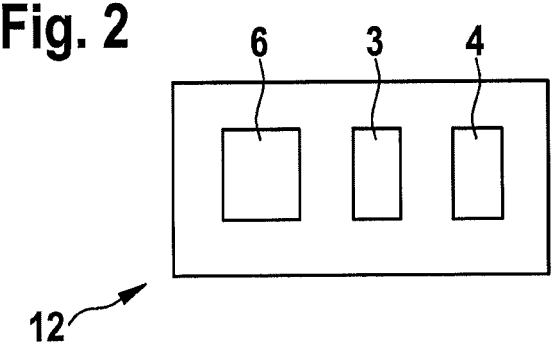
FIG. 2 shows a schematic system diagram of a hybrid drive device.

In hybrid vehicles 1 as motor vehicles 2, which are operated by an electric machine 3 with the aid of electrical power from a battery 4, an internal combustion engine-generator unit 6 is used to increase the range of hybrid vehicle 1. With the aid of internal combustion engine-generator unit 6 as a so-called range extender, an internal combustion engine 7 generates mechanical energy, using fuel from a fuel tank 5 which is led through a fuel line 16, which is converted into electrical power by a generator 8 as a permanent-magnet synchronous machine 9. Internal combustion engine 7 is mechanically connected to generator 8 via a drive shaft 15 (FIG. 1). Generator 8 generates alternating current, which is converted into direct current by an uncontrolled rectifier 11. Thus, internal combustion engine-generator unit 6 has no pulse-controlled inverters, so that electrical power P provided by internal combustion engine-generator unit 6 is directly proportional to speed n of internal combustion engine 7 and to rotational speed n of generator 8. Battery 4 is charged and/or electric machine 3 is operated with the aid of the electrical power from generator 8. The range of hybrid vehicle 1 may thus be significantly increased, for example to ranges of approximately 300 km to 600 km. The range of hybrid vehicle 1 with the aid of electrical power from battery 4 is approximately 50 km to 150 km, for example. A hybrid drive device 12 includes internal combustion engine-generator unit 6, electric machine 3, and a battery 4.

Generator 8 as a synchronous machine 9, uncontrolled rectifier 11, and battery 4 are connected to one another via power lines 17. To charge battery 4 of hybrid vehicle 1 (FIG. 4), the voltage of the direct current provided by rectifier 11 must be higher than the voltage of battery 4. The voltage of battery 4 is a function of the state of charge or the load state of battery 4. Via control lines which are not illustrated, a control unit 13 receives a setpoint value for the voltage of the direct current for charging battery 4. With the aid of this setpoint value, control unit 13 as a device 10 for controlling the voltage of the direct current controls and/or regulates speed n of internal combustion engine 7.

The higher the speed of internal combustion engine 7, and thus also the higher the rotational speed of generator 8, the higher the voltage of the alternating current provided by generator 8, due to the mechanical coupling solely via drive shaft 15. The higher the voltage of the alternating current provided by generator 8, the higher the voltage of the direct current provided by rectifier 11, and vice versa. Thus, by controlling and/or regulating the speed of internal combustion engine 7, and thus also the rotational speed of generator 8, the voltage of the current rectified by rectifier 11 may be controlled and/or regulated for charging the battery.

In another exemplary embodiment of internal combustion engine-generator unit 6 which is not illustrated, internal combustion engine 7 is connected to generator 8 via a gearing. With the aid of this gearing, the rotational speed of generator 8, and thus also the voltage of the direct current provided by rectifier 11, may be controlled and/or regulated independently of the speed of internal combustion engine 7. With the aid of the gearing, not illustrated, control unit 13 controls the rotational speed of generator 8, and thus also the voltage of the direct current provided by rectifier 11.

Figure 4:
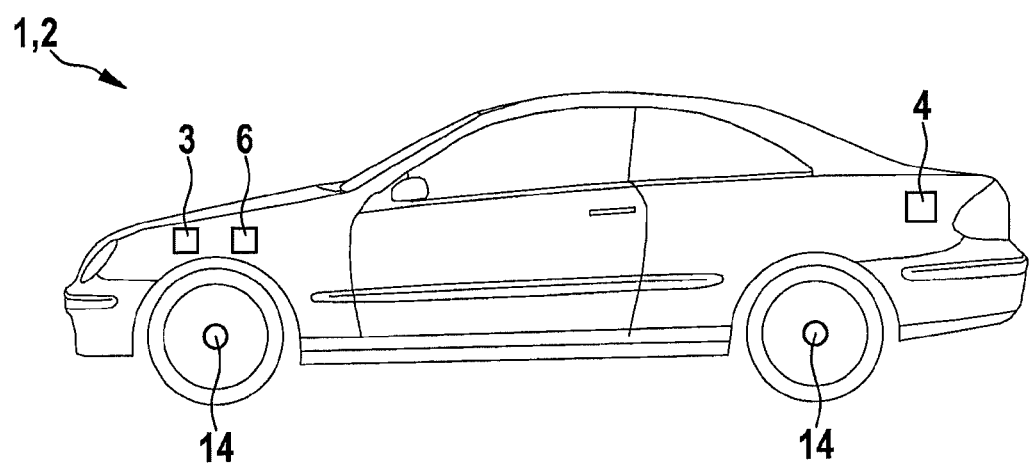
FIG. 4 shows a view of a hybrid vehicle.

Hybrid vehicle 1 is illustrated in FIG. 4. Hybrid vehicle 1 is driven solely by electric machine 3. The electrical power for driving electric vehicle 1 originates from battery 4 and/or internal combustion engine-generator unit 6. To increase the range of electric vehicle 1, internal combustion engine-generator unit 6 according to FIG. 1 is installed in hybrid vehicle 1. The range of hybrid vehicle 2 may thus be increased to approximately 300 km to 600 km. Battery 4 may be charged, and/or electric machine 3 may be operated for the drive or for the traction of hybrid vehicle 1, with the aid of the electrical power provided by generator 8.

Electric machine 3 for driving hybrid vehicle 1 may also be used in regenerative mode as a generator for decelerating or for braking hybrid vehicle 1. Electric machine 3 is thus operated both as an electric motor and as a generator. In regenerative mode, electric machine 3 applies a regenerative torque as negative torque to hybrid vehicle 1, so that hybrid vehicle 1 is braked. With the aid of this regenerative torque, electric machine 3 is driven and generates electrical current for charging battery 4. Battery 4 is preferably a high-voltage battery, having a voltage of greater than 50 volts or 100 volts, for example. During a standstill of hybrid vehicle 1, it may be charged with the aid of an external or internal charger unit (not illustrated), or by an external power supply, for example a 230-volt residential power supply.

Figure 3:
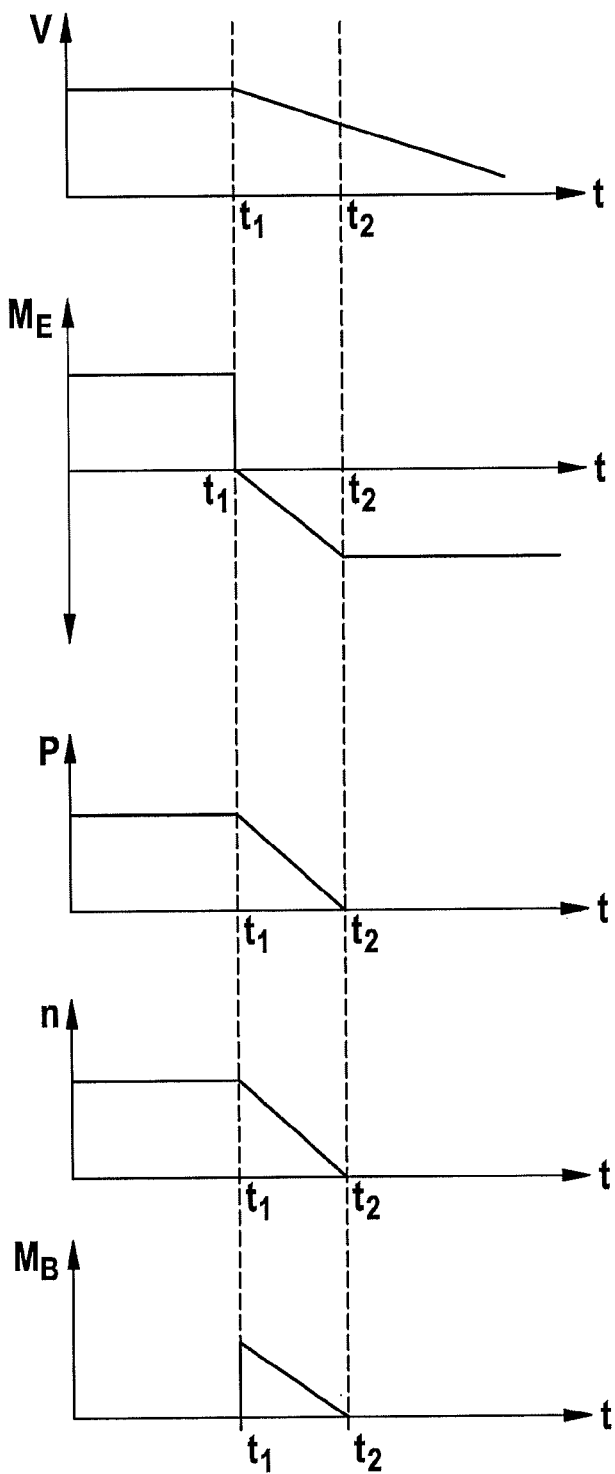
FIG. 3 shows multiple diagrams.

Five diagrams are illustrated in FIG. 3. Time is plotted on the abscissa in all diagrams. In the top diagram illustrated in FIG. 3, speed v of hybrid vehicle 1 is depicted on the ordinate. Hybrid vehicle 1 initially travels at a constant speed, and beginning at a point in time $t_1$ the speed of hybrid vehicle 1 is reduced, so that beginning at point in time $t_1$ a deceleration or braking operation of hybrid vehicle 1 is present.

In the diagram illustrated second from the top in FIG. 3, torque $M_E$ of electric machine 3 is depicted on the ordinate. Until point in time $t_1$, electric machine 3 provides a positive torque $M_E$ as the drive torque for driving hybrid vehicle 1, and beginning at point in time $t_1$, electric machine 3 provides a negative torque, i.e., a regenerative torque for decelerating hybrid vehicle 1. Electric machine 3 is thus operated as an electric motor until point in time $t_1$, and is operated as a generator beginning at point in time $t_1$. The regenerative torque constantly increases from point in time $t_1$ to point in time $t_2$, and beginning at point in time $t_2$ electric machine 3 provides a constant regenerative torque $M_E$. The third diagram illustrated in FIG. 3 depicts electrical power P of internal combustion engine-generator unit 6. Until point in time $t_1$, i.e., during the travel of hybrid vehicle 1 with the aid of mechanical energy from electric machine 3 as an electric motor, internal combustion engine-generator unit 6 provides electrical power P, on the one hand to supply electric machine 3 with electrical power, and on the other hand to charge battery 4. The fourth diagram in FIG. 3 illustrates speed n of internal combustion engine 7 of internal combustion engine-generator unit 6. The electrical power provided by internal combustion engine-generator unit 6 is directly proportional to the speed of internal combustion engine 7, and to the rotational speed of generator 8 of internal combustion engine-generator unit 6, due to the fact that an uncontrolled rectifier 11 is used to convert the alternating current generated by generator 8 into direct current. Hybrid vehicle 1 has hybrid vehicle brakes 14 as disc brakes on each of the four wheels. Beginning at point in time $t_1$, the driver of hybrid vehicle 1 initiates a braking operation by depressing a brake pedal, not illustrated. The driver thus specifies a total braking torque via which hybrid vehicle 1 is to be decelerated. However, when the brake pedal is depressed at point in time $t_1$, it is not possible for the electrical power provided by internal combustion engine-generator unit 6 to be reduced to zero in a very short period of time, for example less than one second or several milliseconds, so that the electrical charging capacity of battery 4, which is composed of the sum of the electrical power provided by internal combustion engine-generator unit 6 and electric machine 3 for charging battery 4, does not exceed a predefined limiting value. For this reason, at point in time $t_1$ the total braking torque is provided solely by hybrid vehicle brakes 14, which apply braking torque $M_B$, and electric machine 3 provides no regenerative torque. From point in time $t_1$ until point in time $t_2$, braking torque $M_B$ of hybrid vehicle brakes 14 is linearly reduced, and at the same time, the regenerative torque of electric machine 3 is increased by the same extent. In addition, from point in time $t_1$ until point in time $t_2$ the electrical power provided by internal combustion engine-generator unit 6 is reduced to zero. Thus, even during the deceleration operation between points in time $t_1$ and $t_2$ the entire electrical charging capacity of battery 4 remains below a predefined limiting value, which in the present exemplary embodiment corresponds to the electrical power of internal combustion engine-generator unit 6 until point in time $t_1$. Beginning at point in time $t_2$, internal combustion engine-generator unit 6 provides no electrical power; i.e., the internal combustion engine-generator unit is switched off, and the deceleration of hybrid vehicle 1 is carried out solely with the aid of the regenerative torque provided by electric machine 3.

The sequences illustrated in FIG. 3 may be changed or varied in numerous ways. For example, beginning at point in time $t_2$, it is possible for the total braking torque to be provided not solely by electric machine 3, but, rather, by hybrid vehicle brakes 14 as well as by electric machine 3 if, for example, the driver of hybrid vehicle 1 desires more intense deceleration of hybrid vehicle 1. If the predefined limiting value of the electrical charging capacity of battery 4 is greater than the electrical power of internal combustion engine-generator unit 6 until point in time $t_1$ according to the third diagram in FIG. 3, electric machine 3 may already provide a (small) regenerative torque, and thus also electrical power for charging battery 4, at point in time $t_1$ without the predefined limiting value of the electrical charging capacity of battery 4 being exceeded. If the driver of hybrid vehicle 1 requests only a very small total braking torque during the deceleration operation, internal combustion engine-generator unit 6 may be operated with lower electrical power even after point in time $t_2$, so that after point in time $t_2$, battery 4 is charged by the electrical power provided by electric machine 3 as well as by the electrical power provided by internal combustion engine-generator unit 6. Different values of braking torque requested by the driver of the hybrid vehicle during a deceleration operation thus result in a variation in the processes or modes of operation of the components of hybrid drive device 12.

A vehicle control unit 18 specifies a required setpoint torque of electric machine 3. An electronic control unit 19 controls and/or regulates electric machine 3 so that the actual torque of electric motor 3 corresponds to the setpoint torque specified by vehicle control unit 18. A range extender control unit 20 controls and/or regulates the electrical power provided by generator 8 of internal combustion engine-generator unit 6. Vehicle control unit 18, electronic control unit 19, and range extender control unit 20 are combined in control unit 13.

Viewed as a whole, significant advantages are associated with hybrid drive device 12 according to the present invention. During and in particular at the start of a deceleration operation, electric machine 3 is not operated, or is operated only to a limited extent, in regenerative mode, so that the electrical charging capacity provided to battery 4 is below a predefined limiting value, since it is not possible to reduce the electrical power provided by internal combustion engine-generator unit 6 during the deceleration operation, in particular during the start of the deceleration operation, to zero or to a lower value within a very short period of time. Thus, the maximum electrical charging capacity provided to battery 4 may be small, and damage to battery 4 may be avoided.

What is claimed is:

1. A method for operating a hybrid drive device including an internal combustion engine-generator unit as a range extender, at least one electric machine for driving and decelerating the hybrid vehicle, and a battery, the method comprising:
    generating mechanical energy in an internal combustion engine of the internal combustion engine-generator unit;
    converting, in a generator of the internal combustion engine-generator unit, the mechanical energy into electrical power; and
    at least one of: i) charging the battery with the electrical power from the generator, and ii) charging the battery with electrical power from the electric machine in a regenerative mode of the electric machine;
    wherein during operation of the at least one electric machine in at least one of: i) the electrical power provided by the generator of the internal combustion engine-generator unit, and ii) the electrical power provided by the at least one electric machine in the regenerative mode for charging the battery, is controlled or regulated so that an electrical charging capacity of the battery is below a predefined limiting value, and
    wherein at least one of: i) the electrical power provided by the generator of the internal combustion engine-generator unit is controlled or regulated in inverse proportion to the regenerative torque of the electric machine, and ii) the regenerative torque of the electric machine is controlled or regulated in inverse proportion to the electrical power provided by the generator of the internal combustion engine-generator unit.

2. The method as recited in claim 1, wherein the electrical power provided by the generator of the internal combustion engine-generator unit is controlled or regulated via at least one of: i) a speed of the internal combustion engine, and ii) a rotational speed of the generator of the internal combustion engine-generator unit.

3. The method as recited in claim 1, wherein the predefined limiting value of the electrical charging capacity is between 0.9 and 2.5 times a maximum electrical power of the internal combustion engine.

4. The method as recited in claim 1, wherein the predefined limiting value of the electrical charging capacity is between 0.9 and 1.5 times a maximum electrical power of the internal combustion engine.

5. The method as recited in claim 1, wherein the electrical charging capacity of the battery is formed from a sum of the electrical power provided by the generator of the internal combustion engine-generator unit and the electric machine.

6. The method as recited in claim 1, wherein a regenerative torque is increased beginning at a start of a deceleration operation.

7. The method as recited in claim 1, wherein alternating current generated by at least one of the generator of the internal combustion engine-generator unit and the electric machine is converted into direct current by an uncontrolled rectifier for charging the battery.

8. The method as recited in claim 1, wherein at least one of an electrical current provided by the generator of the internal combustion engine-generator unit and electrical current provided by the electric machine in regenerative mode for charging the batty is controlled or regulated in such a way that the electrical charging current of the battery is below a predefined current limiting value.

9. The method as recited in claim 1, wherein at least one of:
    i) a vehicle control unit specifies at least one of a regenerative torque and a drive torque of the electric machine;
    ii) an electronic control unit controls or regulates at least one of the regenerative torque, and the drive torque of the electric machine; and
    iii) a range extender control unit controls or regulates electrical power provided by the generator of the internal combustion engine-generator unit.

10. A method for operating a hybrid drive device including an internal combustion engine-generator unit as a range extender, at least one electric machine for driving and decelerating the hybrid vehicle, and a battery, the method comprising:
    generating mechanical energy in an internal combustion engine of the internal combustion engine-generator unit;
    converting, in a generator of the internal combustion engine-generator unit, the mechanical energy into electrical power; and
    at least one of: i) charging the battery with the electrical power from the generator, and ii) charging the battery with electrical power from the electric machine in a regenerative mode of the electric machine;
    wherein during operation of the at least one electric machine in at least one of: i) the electrical power provided by the generator of the internal combustion engine-generator unit, and ii) the electrical power provided by the at least one electric machine in the regenerative mode for charging the battery, is controlled or regulated in such a way that an electrical charging capacity of the battery is below a predefined limiting value, and wherein, during an initial period of a deceleration operation, at least one of: i) the electric machine provides no regenerative torque, and ii) a total braking torque is formed from a sum of the regenerative torque and a braking torque of at least one hybrid vehicle brake.

11. The method as recited in claim 10, wherein the predefined limiting value of the electrical charging capacity is between 0.9 and 2.5 times a maximum electrical power of the internal combustion engine.

12. The method as recited in claim 10, wherein the predefined limiting value of the electrical charging capacity is between 0.9 and 1.5 times a maximum electrical power of the internal combustion engine.

13. The method as recited in claim 10, wherein alternating current generated by at least one of the generator of the internal combustion engine-generator unit and the electric machine is converted into direct current by an uncontrolled rectifier for charging the battery.

14. The method as recited in claim 10, wherein at least one of an electrical current provided by the generator of the internal combustion engine-generator unit and electrical current provided by the electric machine in regenerative mode for charging the battery is controlled or regulated so that the electrical charging current of the battery is below a predefined current limiting value.

15. The method as recited in claim 10, wherein at least one of:
   i) a vehicle control unit specifies at least one of a regenerative torque and a drive torque of the electric machine;
   ii) an electronic control unit controls or regulates at least one of the regenerative torque, and the drive torque of the electric machine; and
   iii) a range extender control unit controls or regulates electrical power provided by the generator of the internal combustion engine-generator unit.

16. A method for operating a hybrid drive device including an internal combustion engine-generator unit as a range extender, at least one electric machine for driving and decelerating the hybrid vehicle, and a battery, the method comprising:
   generating mechanical energy in an internal combustion engine of the internal combustion engine-generator unit;
   converting, in a generator of the internal combustion engine-generator unit, the mechanical energy into electrical power; and
   at least one of: i) charging the battery with the electrical power from the generator, and ii) charging the battery with electrical power from the electric machine in a regenerative mode of the electric machine;
   wherein during operation of the at least one electric machine in at least one of: i) the electrical power provided by the generator of the internal combustion engine-generator unit, and ii) the electrical power provided by the at least one electric machine in the regenerative mode for charging the battery, is controlled or regulated in such a way that an electrical charging capacity of the battery is below a predefined limiting value, and
   wherein during an initial period of a deceleration operation, the electric machine provides no regenerative torque until the electrical power provided by the generator of the range extender is reduced.

17. The method as recited in claim 16, wherein the predefined limiting value of the electrical charging capacity is between 0.9 and 2.5 times a maximum electrical power of the internal combustion engine.

18. The method as recited in claim 16, wherein the predefined limiting value of the electrical charging capacity is between 0.9 and 1.5 times a maximum electrical power of the internal combustion engine.

19. The method as recited in claim 16, wherein the electrical charging capacity of the battery is formed from a sum of the electrical power provided by the generator of the internal combustion engine-generator unit and the electric machine.

20. The method as recited in claim 16, wherein alternating current generated by at least one of the generator of the internal combustion engine-generator unit and the electric machine is converted into direct current by an uncontrolled rectifier for charging the battery.

21. The method as recited in claim 16, wherein at least one of an electrical current provided by the generator of the internal combustion engine-generator unit and electrical current provided by the electric machine in regenerative mode for charging the battery is controlled or regulated so that the electrical charging current of the battery is below a predefined current limiting value.

22. The method as recited in claim 16, wherein at least one of:
   i) a vehicle control unit specifies at least one of a regenerative torque and a drive torque of the electric machine;
   ii) an electronic control unit controls or regulates at least one of the regenerative torque, and the drive torque of the electric machine; and
   iii) a range extender control unit controls or regulates electrical power provided by the generator of the internal combustion engine-generator unit.

* * * * *